March 8, 1932. J. HARRIS 1,848,713
COOKING UTENSIL
Filed June 26, 1929 2 Sheets-Sheet 1
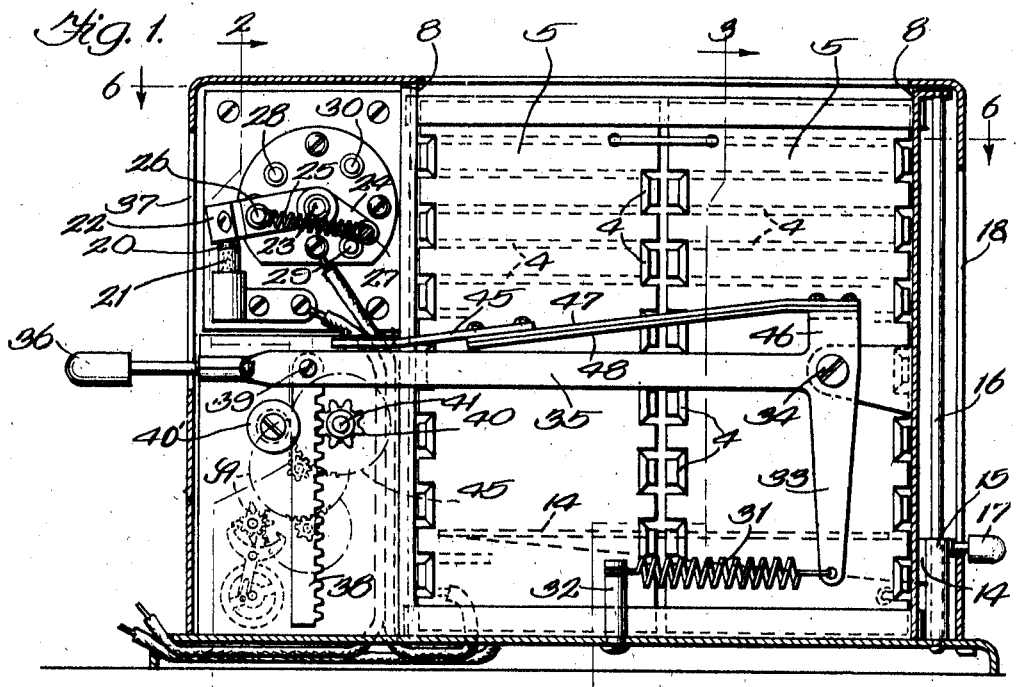
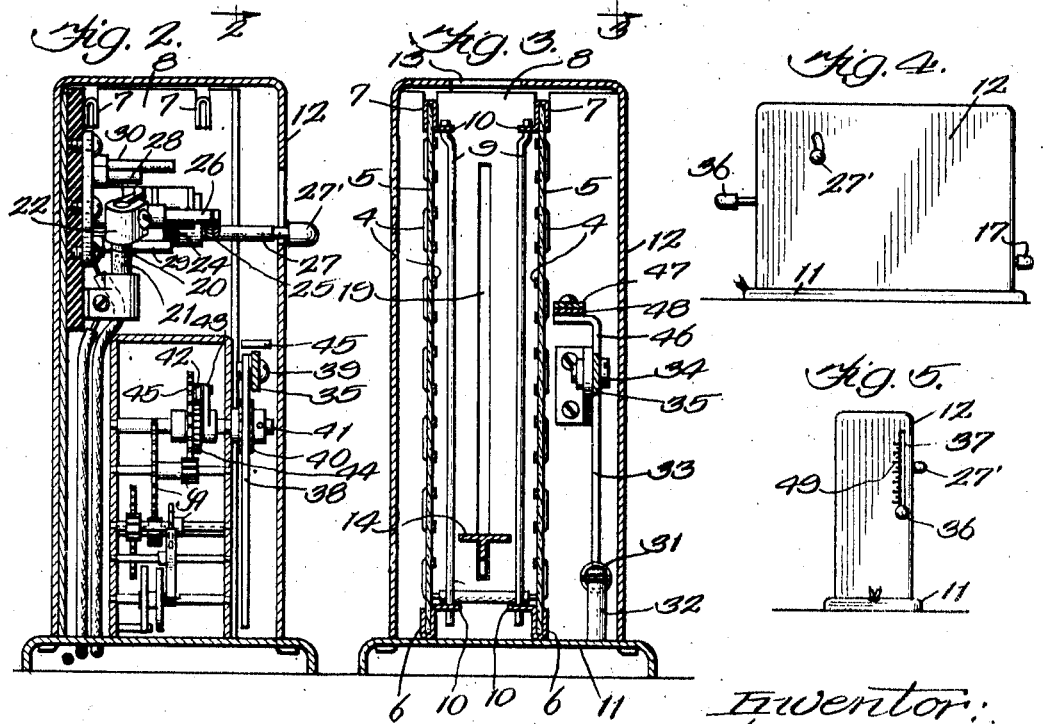
Inventor:
Jesse Harris
By G. L. Gragg Atty.

March 8, 1932.  J. HARRIS  1,848,713
COOKING UTENSIL
Filed June 26, 1929    2 Sheets-Sheet 2
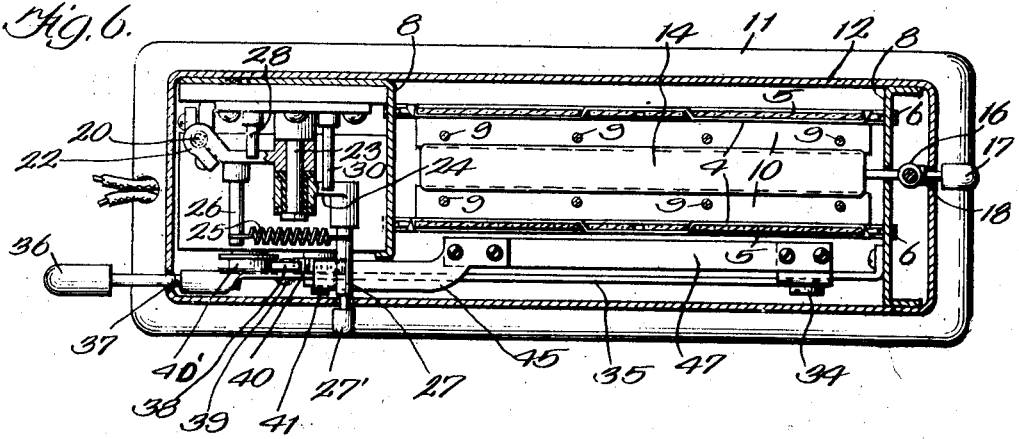
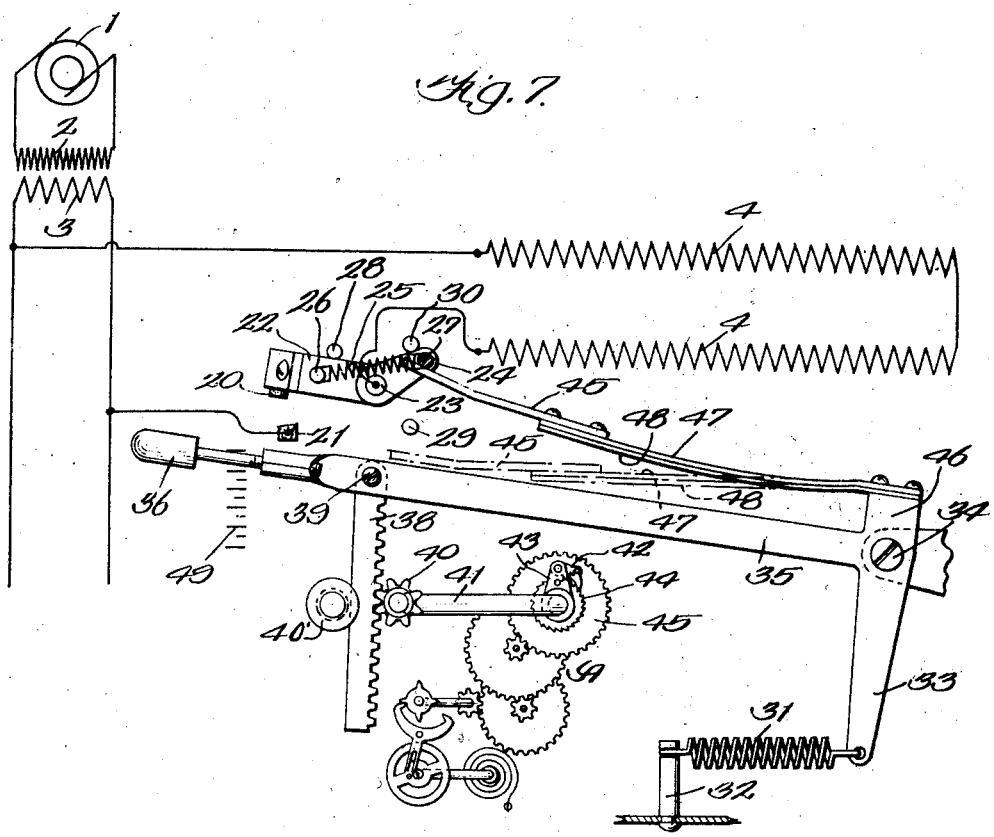
Inventor:
Jesse Harris Patented Mar. 8, 1932

1,848,713

UNITED STATES PATENT OFFICE

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS

COOKING UTENSIL

Application filed June 26, 1929. Serial No. 373,770. REISSUED

My invention relates to cooking utensils employing electric current conducting heating units for furnishing cooking heat and heated by current passing therethrough, circuit opening and closing switches for such heating units, and timing mechanisms serving to open and close the switches. My invention is of particular utility in connection with electrically operated toasters, bacon grills, waffle irons, etc. In such utensils of the prior art the switches were opened at the conclusion of predetermined fixed intervals defined by the timing mechanisms under the assumption that the product to be subject to the cooking heat would be uniformly cooked or toasted with given adjustments of the timing mechanisms. This is not the result in practice as such a utensil itself absorbs and accumulates heat during each closely succeeding operation, getting hotter and hotter as the repeated use of the utensil continues, until so much heat has been accumulated that the product may be over-cooked or burned, unless the duration of the periods be shortened manually which would deprive the utensil of much of its automatic character. Another objection to such a device of the prior art is due to the rise or fall in the voltage of the heating circuit, since a greater or less amount of heat, for a given period, would accordingly be generated in the heating unit. This objectionable characteristic is present whether the operations are in close succession or not, with the result that the product may be overcooked upon rise in the voltage and undercooked upon drop in the voltage.

In practicing my invention, I automatically vary the cooking interval to make this interval proportional to the available temperature whereby the heat units are made constant for each operation and with the given setting of the timing mechanism. With the device of my invention, the cooking period is increased for a lower temperature and decreased for a higher temperature. That is, the amount of cooking heat absorbed by the material to be cooked in the device of my invention is maintained constant, for a given setting of the timing mechanism, and is not altered by the voltage variation and is not subject to undue accumulation. The cooking utensil of my invention is inclusive of a device that is subject to the heating of the heating unit of the utensil and controls and varies the relation between the timing mechanism and the switch to vary the duration of the closure of the switch and thereby compensate for accumulated heat and variation in the heating effect of the heating current due to variation in voltage. In the preferred embodiment of the invention, my device is directly associated with the switch to vary the spacing between it and the timing mechanism and is desirably so related as to be moved by the timing mechanism and to move the switch in a circuit opening direction. This device is preferably thermo-motive, so that its position toward or from the switch is governed by the temperature to which the device is subjected. In my preferred device, there is a gap between the switch and the thermo-motive device, this gap being shortened upon increase in temperature to speed up the opening of the switch and lengthened upon decrease in temperature to delay the opening of the switch.

I will explain my invention more fully by reference to the accompanying drawings in which Fig. 1 is a sectional elevation illustrating one embodiment of the invention; Fig. 2 is a sectional view on line 2—2 of Fig. 1; Fig. 3 is a sectional view on line 3—3 of Fig. 1; Fig. 4 is a side elevation, on a smaller scale; Fig. 5 is an end elevation, on a smaller scale; Fig. 6 is a sectional view on line 6—6 of Fig. 1; and Fig. 7 is a diagrammatic illustration.

The heating current may be derived from any suitable source. I have illustrated a single phase alternating current generator 1 in circuit with the primary 2 of a transformer whose secondary 3 supplies the heating unit of the utensil with heating current. This heating unit is shown as being comprised of two layers 4 of wire arranged in sinuous folds to constitute heating coils. These layers of wire are arranged vertically upon plates 5 of insulation. The bottom edge portions of these plates are tucked within clips 6 and the top edge portions within clips 7. Upright plates 8 assemble the clips which are secured thereto at the ends of the clips. Upright guiding rods 9 are secured to wing extensions 10 of the clips. A casing encloses the parts described, this casing being inclusive of a bottom portion 11 and the hood portion 12 suitably assembled with the bottom portion. The device illustrated is a toaster in which case a slot 13 is provided in the top of the casing and in register with the space between the rods 9. A support 14 is provided between the two sets of rods 9 on which the bread to be toasted may be supported between these two sets of rods, the rods of each set serving to guard the bread from direct contact with the resistance wiring. For sake of simplicity of illustration, the bread support 14 is manually raised and manually lowered. It is guided in its vertical movements by means of the sleeve 15 and the upright rod 16 passing through the sleeve and on which the sleeve is vertically movable. A handle 17 projects from the sleeve, the stem of the handle moving in the upright slot 18 formed in the casing. The connection between the sleeve and the bread support passes through an upright slot 19 which is formed in the adjacent plate 8. Other means may obviously be employed for supporting the bread or other product that is to be subject to cooking heat.

The switch for opening and closing the heating unit that comprises the resistance coils 4 is desirably inclusive of two carbon contacts 20 and 21. The carbon contact 20 is shown as being carried by one end of a swinging current conducting switch arm 22 which is pivotally mounted at the other end, at 23. A switch operating arm 24 is also pivoted at 23. A coiled spring 25 is connected, at one end, with the arm 22 at a point 26 somewhat remote from the pivot 23. The other end of this spring is connected with the arm 24 at a point 27 also remote from said pivot. The range of movement of the arm 22 is defined by the contact 21 and the abutment post 28 between which the arm 22 is movable and with which said arm is engageable. The range of movement of the arm 24 is defined by the abutment posts 29 and 30. These arms are so related and their ranges of movement are such that the spring 25 is on one side of the pivot 23 when the switch is opened and on the other side of said pivot when the switch is closed. The spring serves to snap the contact 20 into and out of engagement with the contact 21 just after this spring reaches a position slightly upon one side or the other of the pivot, as will be apparent. The switch is directly operated by the timing mechanism, in the device as shown. This timing mechanism is inclusive of any suitable gear train such as that illustrated at A. The main spring for operating the timing mechanism is desirably a coiled spring 31 which is stationarily anchored, at one end, to the post 32 and is connected at its other end to one end 33 of the head of a T-shaped lever. This lever is pivoted at 34 where the head branches from the stem 35. The lever stem 35 carries a handle 36 whose stem passes through an upright slot 37 in the casing of the utensil. When the handle 36 is depressed, the T-shaped lever is turned counterclockwise to place the main spring 31 under increased tension. When the lever is thus depressed, the upright rack bar 38, which is pivoted to the lever stem 35 at 39, is lowered. In being lowered the rack bar idly turns the pinion 40 that is in mesh therewith and is guided in its movements by the roller 40'. When the handle 36 is released, the spring 31 will turn the lever 33, 35 in a clockwise direction. The rack bar 38 will, consequently, be elevated and, in being elevated, will actively turn the pinion 40, the shaft 41 in this pinion then causing clockwise movement of the pawl 42 which is pivoted upon the arm 43 that is fixed upon the shaft. The pawl 42, in its clockwise movement, has fixed engagement with some tooth of the ratchet wheel 44, which is fixed upon and coaxial with the gear wheel 45 of the train A. It may now be said that when the handle 36 is depressed in setting the timing mechanism, said pawl escapes or rides over the teeth of said ratchet wheel, so as then to have no influence upon the train of gears. By means of the well known gear mechanism which is operated by the pinion 40 as the rack bar 38 rises, the upward movement of this rack bar is retarded, so that the clockwise movement of the lever 33, 35 effected by the main spring 31 is slow. Just as soon as the handle 36 has been fully depressed, the handle 27' upon the post 27 is depressed to move the arm 24 from its upper position Fig. 7 to its lower position, Fig. 1, to engage the switch contact 20 with the switch contact 21, Fig. 1. When the rack bar has finished its upward travel the arm 24 is raised to separate the switch contact 20 from the contact 21. To this end a motion transmitting member 45 is carried upon the other end 46 of the head of the T lever. This motion transmitting member is in separable engagement with the post 27 upon the arm 24, and presses upwardly upon this post during the final operation of the clockwise movement of the T lever to bring the arm 24 from its lowered position, shown in Fig. 1, to a position in which the spring 25 is slightly above the pivot 23, whereupon said spring will effect a snap movement of the switch arm 22 in a clockwise direction to quickly separate the contact 20 from the contact 21. This result occurs at the conclusion of the toasting or cooking operation of the heat furnished by the heating unit 4 upon the bread or other product. The motion transmitting member 45 is coupled with the T lever by a link whose shape or disposition varies with the temperature. This link is a thermo-motive device, which is preferably in the form of a thermostat, that is inclusive of a strip of steel 47 and a strip of brass 48. This thermostat or thermo-motive device changes the position of the switch operating member 45 with relation to the T lever. The thermo-motive device 47, 48 is positioned to be within the influence of the heat furnished by the resistance unit 4. Increased temperature will cause flexure upwardly of the thermo-motive device to position the switch operating member 45 further from the stem 35 and closer to the post 27 so that as the rack bar rises the opening of the switch will be advanced. As the temperature drops the thermo-motive device will flex downwardly to bring the switch operating member 45 closer to the stem of the lever 35 and further from the post 27, so that the opening of the switch is delayed. In this way, opening of the switch, although effected by the spring 31 operating through the delay gearing A, is hastened or retarded through the influence of the heat furnished by the heating unit 4 to cause the product within the utensil to be subject to the same number of heat units and irrespective of the voltage and of whether or not such heat units have been accumulated by closely succeeding operations of the utensil. While I have shown a member 45 as being attached to ends of the parts 47 and 48, I do not wish to be limited to this construction, as it is obvious that the part 47 of the switch operating member 47, 48 may be directly continued into engagement with the post 27. Scale marks 49 may margin one side of the slot 37 to generally determine the duration of the closure of the heating unit, the stem of the handle 36 being lowered ito register with the selected scale mark when the timing mechanism is set for operation.

Changes may be made without departing from the invention.

Having thus described my invention, I claim:

1. A thermo-electric switch comprising a switch element, spring means yieldingly holding the switch element in either its "on" or "off" status, means for operating the switch to its "on" status, means for operating the switch to its "off" status, said last named means comprising a pivoted lever, spring means constantly tending to move said lever in one direction, and a thermostatically controlled device carried by the lever adapted to engage and operate the switch element to "off" position during movement of the lever under the influence of said spring means.

2. A thermo-electric switch comprising a switch element, spring means yieldingly holding the switch element in either its "on" or "off" status, means for operating the switch to its "on" status, means for operating the switch to its "off" status, said last named means comprising a pivoted lever, spring means constantly tending to move said lever in one direction, and a device carried by the lever adapted to engage and operate the switch element to "off" position during movement of the lever under the influence of said spring means, said device being thermostatically operated to assume a position closer to its switch opening position upon increase in temperature and further from its switch opening position upon decrease of temperature.

3. A thermo-electric switch comprising a support, a shaft mounted on said support, two arms rotatably mounted on the shaft and extending on opposite sides thereof respectively, a fixed contact on the support, a contact carried by one of the arms for cooperation with the fixed contact, a stop limiting movement of the contact carrying arm away from the fixed contact, stops limiting movement of the other arm in either direction, a spring connection between the arms operable by predetermined movements of one of the arms to move and yieldingly hold said arms in positions to establish the "on" and "off" status of the switch respectively, a handle for moving one of the arms to establish the "on" status of the switch, and means spring operated in one direction to move said last named arm to establish the "on" status of the switch, said means including a thermo-controlled element coacting with said handle.

4. A thermo-electric switch comprising a support, a shaft mounted on said support, two arms rotatably mounted on the shaft and extending on opposite sides thereof respectively, a fixed contact on the support, a contact carried by one of the arms for cooperation with the fixed contact, a stop limiting movement of the contact carrying arm away from the fixed contact, stops limiting movement of the other arm in either direction, a spring connection between the arms operable by predetermined movements of one of the arms to move and yieldingly hold said arms in positions to establish the "on" and "off" status of the switch respectively, a handle for moving one of the arms to establish the "on" status of the switch, a pivoted lever spring-actuated in one direction, and a thermo-controlled element carried by the lever and coacting with said handle during spring actuation of the lever to operate the switch to "off" status.

In witness whereof, I hereunto subscribe my name.

JESSE HARRIS.